US010766359B2

(12) United States Patent
Hirose et al.

(10) Patent No.: US 10,766,359 B2
(45) Date of Patent: Sep. 8, 2020

(54) HOUSING CONNECTION FOR FUEL FILLER PORT DEVICE

(71) Applicant: NIFCO INC., Yokosuka-shi, Kanagawa (JP)

(72) Inventors: Takatsugu Hirose, Yokosuka (JP); Shunpei Nabeya, Sagamihara (JP); Kensuke Ogose, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/758,931

(22) PCT Filed: Aug. 30, 2016

(86) PCT No.: PCT/JP2016/075358
§ 371 (c)(1),
(2) Date: Mar. 9, 2018

(87) PCT Pub. No.: WO2017/043376
PCT Pub. Date: Mar. 16, 2017

(65) Prior Publication Data
US 2018/0236869 A1    Aug. 23, 2018

(30) Foreign Application Priority Data
Sep. 9, 2015 (JP) .................................. 2015-177267

(51) Int. Cl.
*B60K 15/04* (2006.01)

(52) U.S. Cl.
CPC .......... *B60K 15/0406* (2013.01); *B60K 15/04* (2013.01); *B60K 2015/0429* (2013.01);
(Continued)

(58) Field of Classification Search
USPC ........................................... 285/39
See application file for complete search history.

(56) References Cited

U.S. PATENT DOCUMENTS 6,983,773 B1    1/2006  Hagano et al.
7,967,042 B2 *  6/2011  Groom .................. B60K 15/04
                                                        141/350
(Continued)

FOREIGN PATENT DOCUMENTS

CN    103459185 A    12/2013
JP    H08-107616 A    4/1996
(Continued)

OTHER PUBLICATIONS

PCT/ISA/210, "International Search Report for International Application No. PCT/JP2016/075358," dated Oct. 18, 2016.
(Continued)

*Primary Examiner* — Daphne M Barry
(74) *Attorney, Agent, or Firm* — Manabu Kanesaka

(57) ABSTRACT

The fuel filler neck device is attached to a filler pipe and is opened and closed by a fueling nozzle. The device has a cover member which has an introduction opening for the fueling nozzle and which is engaged with the filler pipe side with engagement parts formed on the filler pipe side being fitted in window holes. Insertion parts are respectively formed adjacent to the engagement parts in the circumferential direction of the filler pipe. The engagement parts can be each disengaged by deforming or breaking the cover member side by inserting a portion of a tool into the insertion part.

2 Claims, 11 Drawing Sheets

(52) U.S. Cl.
CPC ............... *B60K 2015/0461* (2013.01); *B60K 2015/0477* (2013.01); *B60Y 2304/076* (2013.01)

(56) References Cited

U.S. PATENT DOCUMENTS

| | | | |
|---|---|---|---|
| 8,807,369 B2 | 8/2014 | Sasaki | |
| 9,987,922 B2* | 6/2018 | Song | B60K 15/0406 |
| 2008/0087354 A1* | 4/2008 | Cisternino | B60K 15/0406 |
| | | | 141/350 |
| 2010/0024422 A1* | 2/2010 | Henderson | B01D 1/0035 |
| | | | 60/641.8 |
| 2011/0025042 A1* | 2/2011 | McNeil | F16L 25/0045 |
| | | | 285/39 |
| 2012/0024422 A1* | 2/2012 | Cisternino | B60K 15/04 |
| | | | 141/349 |
| 2012/0192994 A1* | 8/2012 | Hagano | B60K 15/04 |
| | | | 141/379 |
| 2013/0075395 A1 | 3/2013 | Hagano | |
| 2018/0312055 A1* | 11/2018 | Hirose | B60K 15/04 |

FOREIGN PATENT DOCUMENTS

| | | |
|---|---|---|
| JP | 4048952 B2 | 12/2007 |
| JP | 2013-071504 A | 4/2013 |
| JP | 2014-125008 A | 7/2014 |
| JP | 2015-067139 A | 4/2015 |

OTHER PUBLICATIONS

China Patent Office, "Office Action for Chinese Patent Application No. 201680051803.7," dated Dec. 3, 2019.

* cited by examiner

HOUSING CONNECTION FOR FUEL FILLER PORT DEVICE

TECHNICAL FIELD

The present invention relates to a fuel filler port device that enables fuel feeding, when a fuel filler nozzle is inserted, by opening a fuel filler port and allowing the insertion.

BACKGROUND ART

Patent Literature 1 discloses a device enabling fuel feeding, that is attached to an upper end of a filler pipe (also referred to as an inlet pipe), and is opened by insertion of a fuel filler nozzle of a fuel filler gun.

The device of Patent Literature 1 has an upper side closing body and a lower side closing body that are pushed and opened by the fuel filler nozzle, and thereby, the device does not need a screwed-type fuel filler port cap.

CITATION LIST

Patent Literature

Patent Literature 1: JP 4048952 B2

SUMMARY OF INVENTION

Technical Problem

A main problem to be solved by the present invention is, in the fuel filler port device of the type, when a failure such as a damage and wear occurs in a part composing the fuel filler port device, to make detachment and exchange of the part of a filler pipe, easy to be performed without damaging a filler pipe side.

Solution to Problem

In order to solve the problem described above, in the present invention, a fuel filler port device is configured to be attached to a filler pipe, and opened and closed by a fuel filler nozzle, the fuel filler port device has a cover member that has an introduction opening of the fuel filler nozzle, and accommodates in a window hole an engagement portion formed in the filler pipe side to be engaged to the filler pipe side, an insertion portion is formed adjacent to the engagement portion in a circumferential direction of the filler pipe, and the engagement is releasable by deformation or destruction of the cover member side by insertion of a part of a tool, or the like, to the insertion portion.

When a damage or wear occurs in the cover member due to insertion, detachment, or the like of the fuel filler nozzle, a part of a tool, or the like, such as a tip end of a driver, is inserted to the insertion portion through the window hole of the cover member, and a part of the cover member located in between the window hole and a lower end of the cover member, is deformed or destroyed by the part of the tool, or the like, and thereby, the cover member can be easily detached from the filler pipe.

In an aspect of the present invention, the engagement portion is composed of two engagement projection portions that are adjacent to each other with the insertion portion therebetween in the circumferential direction of the filler pipe. In such configuration, while the engagement strength of the engagement portion with respect to the window hole is secured, the engagement can be easily released.

In an aspect of the present invention, a recess is formed in an outer surface portion of the filler pipe side, in the insertion portion. In such configuration, insertion of a part of a tool, or the like, to the insertion portion can be sufficiently facilitated.

In an aspect of the present invention, a closing member that opens the introduction opening by introducing the fuel filler nozzle, is included in the cover member. In an aspect of the present invention, in this case, a guide member of the fuel filler nozzle is included in a deeper side of the closing member, a seal member including a deeper side closing member that is opened and closed by the fuel filler nozzle is included in a deeper side of the guide member, detachment of the guide member is allowed by releasing the engagement of the cover member and detaching the cover member from the filler pipe side, and detachment of the seal member is allowed by the detachment of the guide member.

Advantageous Effects of Invention

According to the present invention, detachment and exchange of a part can be easily performed without damaging a filler pipe side, when a failure such as a damage and wear occurs in the part composing a fuel filler port device.

DESCRIPTION OF EMBODIMENTS

A typical embodiment of the present invention will be described below with reference to FIG. 1 to FIG. 11. A fuel filler port device according to the embodiment is attached to a filler pipe (not illustrated) and comprises a fuel filler port 5. The fuel filler port device, when a fuel filler nozzle is inserted, opens a fuel filler port 5 to allow the insertion and automatically closes the fuel filler port 5 when the inserted fuel filler nozzle is withdrawn.

That is, when the fuel filler nozzle 1' (illustrated in FIG. 9) of a fuel filler gun is inserted to the fuel filler port 5, the fuel filler port device rotates a closing member 11 and a deeper side closing member described layer and allows the insertion of the fuel filler nozzle to an open position, and enables fuel feeding. When the inserted fuel filler nozzle is withdrawn, the fuel filler port device moves back the closing member 11 and the deeper side closing member 31 described later to a closed position, and automatically closes the fuel filler port 5. Thereby, the fuel filler port device does not need a screwed-type cap of the fuel filler port 5.

Figure 2:
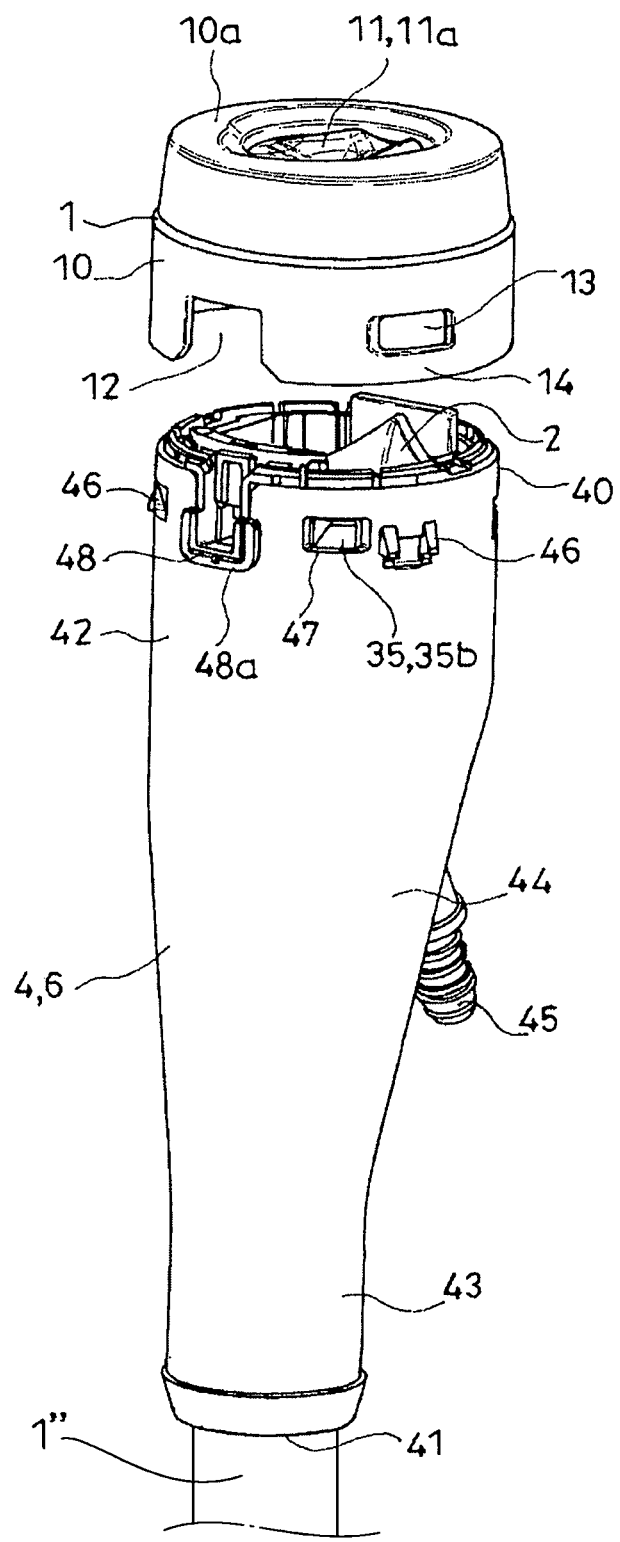
FIG. 2 is a perspective configuration diagram illustrating a state where a cover member composing the fuel filler port device is detached from a holder member that is a fuller pipe side.

The fuel filler port device is attached to an upper end portion of a filler pipe (fuel injection pipe 1" illustrated in FIG. 2).

Figure 1:
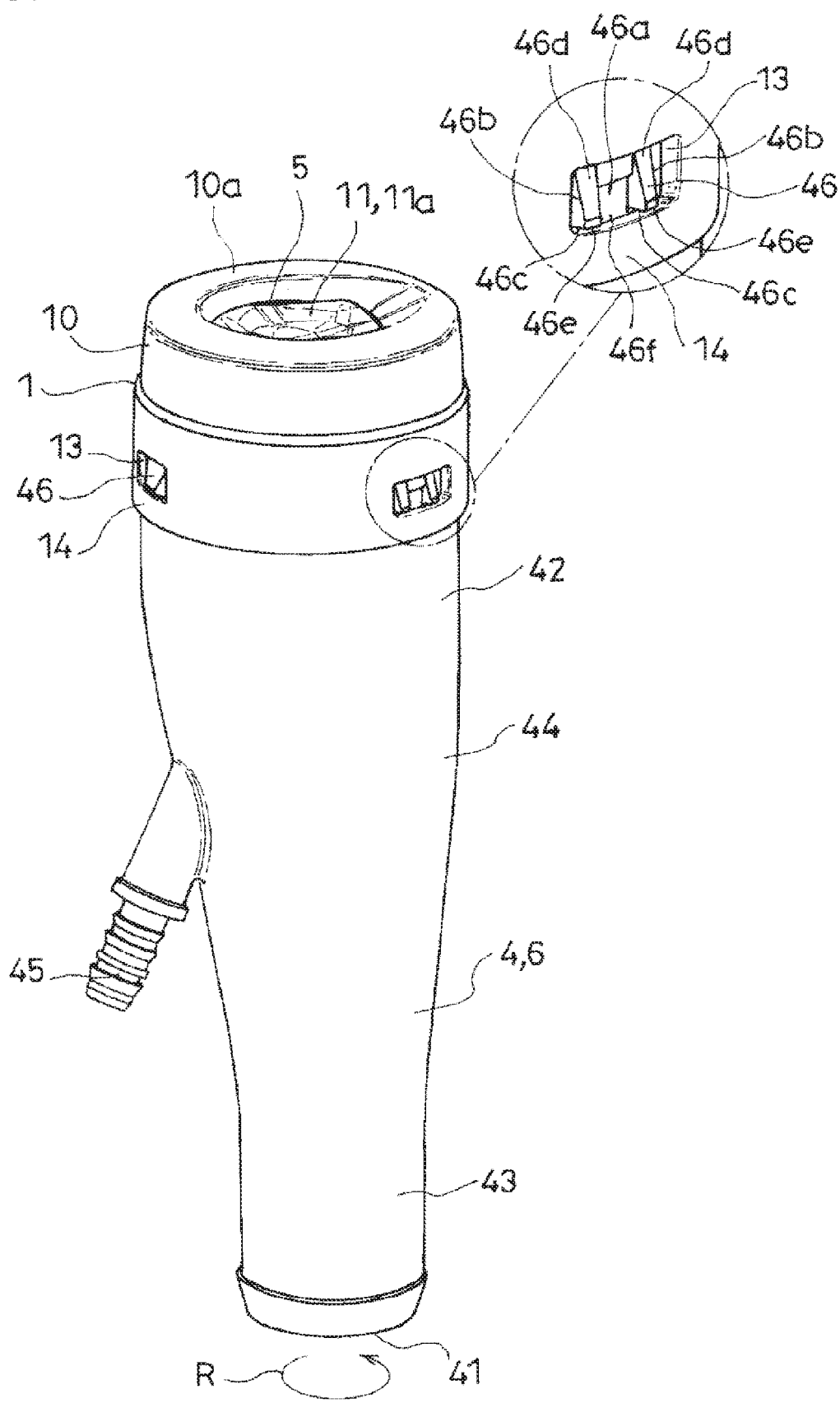
FIG. 1 is a perspective configuration diagram of a fuel filler port device according to an embodiment of the present invention.
Figure 3:
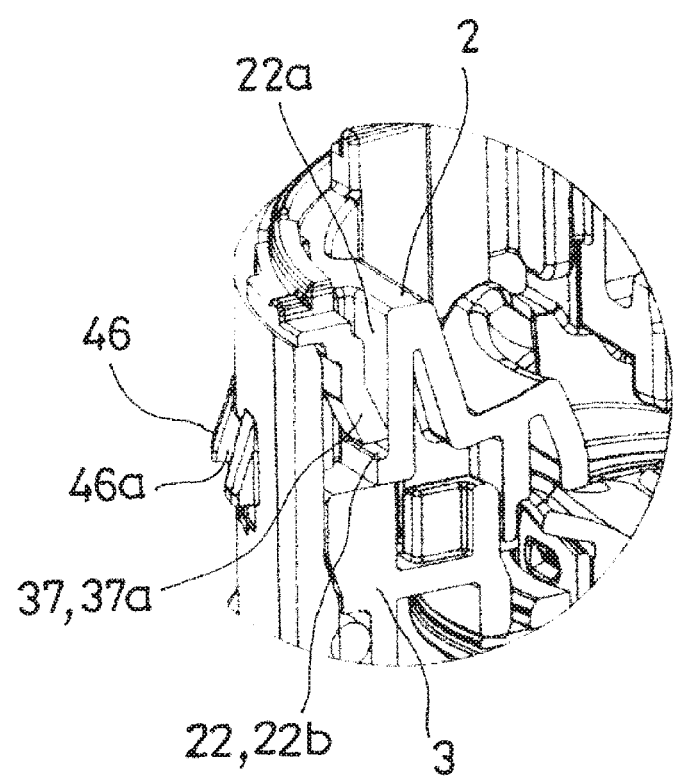
FIG. 3 is a partial cutaway end surface configuration diagram of the fuel filler port device in the state of FIG. 2.

In the illustrated example, as illustrated in FIG. 1 to FIG. 3, the fuel filler port device is composed of a cover member 1, a guide member 2, a seal member 3, and a holder member 4.

The holder member 4 is attached to the filler pipe to be integrated with the filler pipe, and serves as a filler pipe side 6 with respect to the cover member 1, the guide member 2, and the seal member 3. The seal member 3 fits in the holder member 4, and the guide member 2 fits in the seal member 3. The cover member 1 is configured to be able to accommodate an upper portion side of the holder member 4 incorporating the seal member 3 and the guide member 2 in the inside, and attached to the holder member 4.

Figure 8:
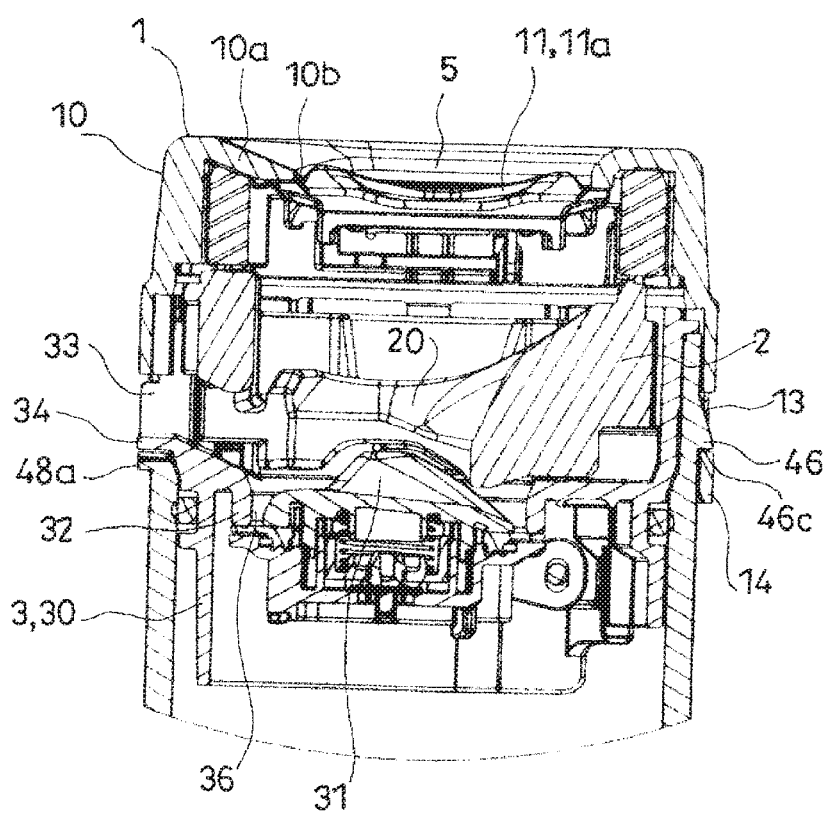
FIG. 8 is a cross section configuration diagram in an A-A line position in FIG. 7.
Figure 9:
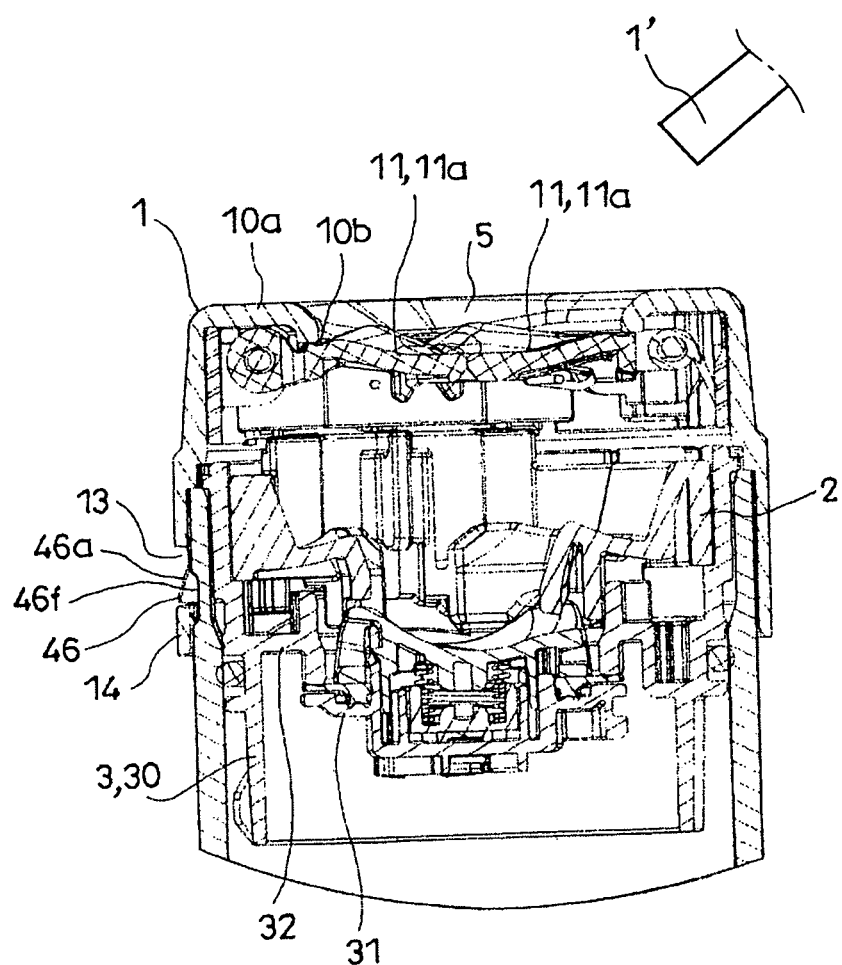
FIG. 9 is a cross section configuration diagram in a B-B line position in FIG. 7.
Figure 10:
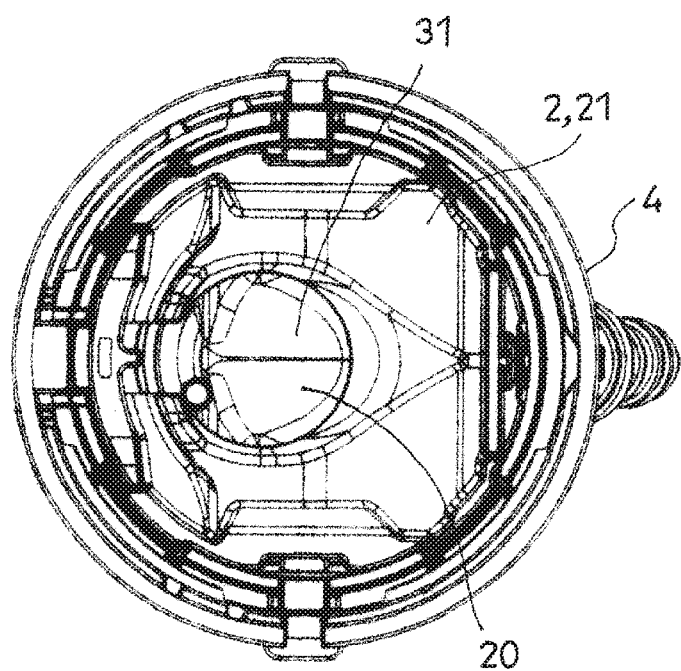
FIG. 10 is a plan configuration diagram of the filler pipe side in the state of FIG. 2.

That is, in the embodiment, as illustrated in FIG. 8 and FIG. 9, the guide member 2 of the fuel filler nozzle is included in a deeper side of the closing member 11 described later, that is included in the cover member 1, and the seal member 3 including the deeper side closing member 31 that is opened and closed by the fuel filler nozzle is included in a deeper side of the guide member 2. Detachment of the guide member 2 is allowed by releasing the engagement of the cover member 1 and detaching the cover member 1 from the filler pipe side 6, and detachment of the seal member 3 is allowed by the detachment of the guide member 2.

Thereby, in the embodiment, when a damage or wear occurs in the cover member 1 due to insertion, detachment, or the like of the fuel filler nozzle, the cover member 1 can be exchanged by being detached from the filler pipe side 6. In the embodiment, as described later, detachment of the cover member 1 from the filler pipe side 6 is facilitated.

When a damage or wear occurs in the guide member 2 due to insertion, detachment, or the like of the fuel filler nozzle, the guide member 2 can be exchanged by being detached from the filler pipe side 6, by detaching the cover member 1.

When a damage or wear occurs in the seal member 3 due to insertion, detachment, or the like of the fuel filler nozzle, the seal member 3 can be exchanged by being detached from the filler pipe side 6, by detaching the cover member 1, and then detaching the guide member 2.

(Holder Member 4)

Figure 4:
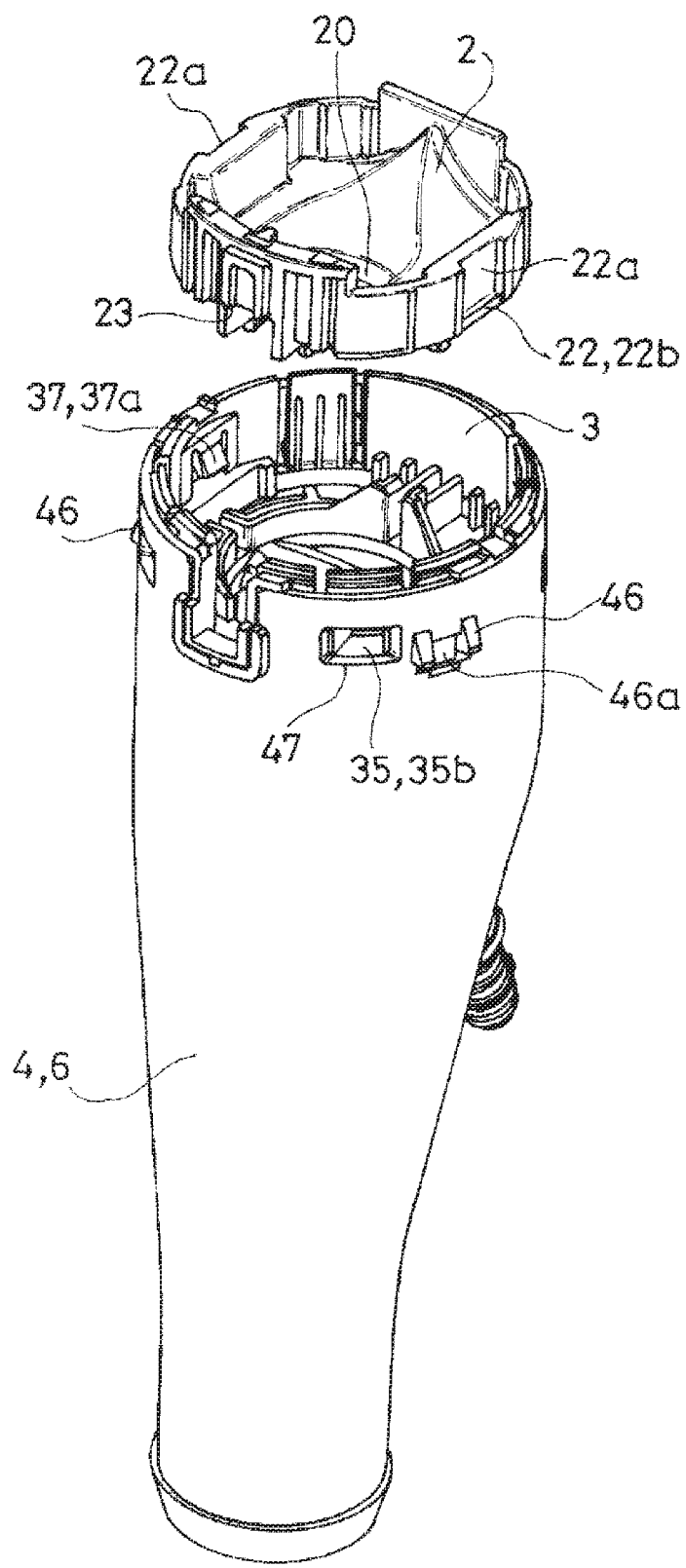
FIG. 4 is a perspective configuration diagram illustrating a state where a guide member composing the fuel filler port device is detached from the state of FIG. 2.

As illustrated in FIG. 2, the holder member 4 has a substantially cylindrical shape, and is opened in an upper end 40 and a lower end 41. The holder member 4 has a large diameter portion 42 from the upper end 40 to a middle position in a vertical direction of the holder member 4, and a small diameter portion 43 at a lower end 41 side of the holder member 4. The holder member 4 has a configuration in which the portion between the large diameter portion 42 and the small diameter portion 43 is a tapered portion 44 in which inner and outer diameters of the holder member 4 are gradually reduced as extending downward. As illustrated in FIG. 4, the seal member 3 fits in the large diameter portion 42 from the upper end 40 of the holder member 4. A component illustrated by a reference numeral 45 in the drawing is a branched pipe, an upper end of which communicates with the tapered portion 44, and extends downward.

As illustrated in FIG. 1, a plurality of engagement portions 46 . . . 46, in the illustrated example, engagement portions 46 . . . 46 corresponding to three window holes 13 . . . 13 of the cover member 1, is formed on an outer surface portion of the large diameter portion 42 of the holder member 4 so as to be spaced from adjacent engagement portion 46 in a direction circulating a cylindrical axis of the holder member 4, that is, a circumferential direction R of the filler pipe.

Among the three engagement portions 46 . . . 46, two engagement portions 46, 46 illustrated in FIG. 2 are formed with an insertion portion 46a adjacent to the engagement portion 46 in the circumferential direction R of the filler pipe, as illustrated in FIG. 1.

Particularly, in the illustrated example, regarding the two engagement portions 46, 46 illustrated in FIG. 2, the engagement portion 46 is composed of two engagement projection portions 46b, 46b adjacent to each other having the insertion portion 46a therebetween in the circumferential direction R of the filler pipe, as illustrated in FIG. 1.

In the engagement projection 46b, a lower side from a top portion 46e is an engagement part 46c, and an upper side from the top portion 46e is an inclined portion 46d in which a projection length of the engagement projection portion 46b gradually increases as approaching the top portion 46e.

In the illustrated example, as illustrated in FIG. 2, a recess 46f is formed in an outer surface portion of the filler pipe side 6 in the insertion portion 46a.

In the illustrated example, as illustrated in FIG. 2, an engagement hole 47 that receives a protruding portion 35b of a first engagement portion 35 of the seal member 3 is formed in the large diameter portion 42 of the holder member 4, that is between the adjacent engagement portions 46, 46.

(Seal Member 3)

As illustrated in FIG. 8, a seal member 3 includes a cylindrical main body 30, and a deeper side closing member 31. The cylindrical main body 30 is opened in an upper end and a lower end, and has a substantially cylindrical shape. An internal space of the cylindrical main body 30 is partitioned into upper portion and a lower portion by a partition wall 32, in between the upper end and the lower end.

An outer diameter of the cylindrical main body 30 is substantially equal to an inner diameter of the holder member 4.

In the illustrated example, a notch portion 33 extending from the upper end of the cylindrical main body 30 to near the partition wall 32 is formed. A projection portion 34 hemming a lower edge of the notch portion 33 is formed in an outer side of the cylindrical main body 30 (see FIG. 8).

Figure 5:
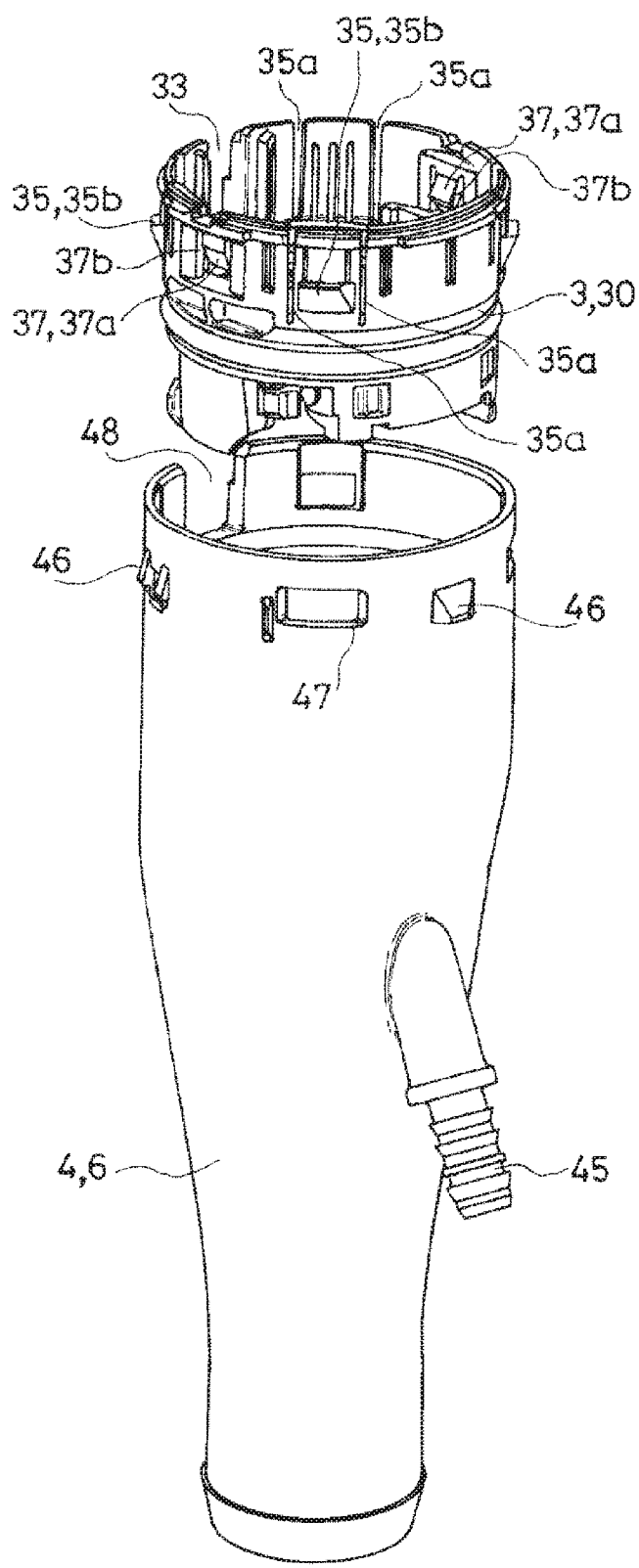
FIG. 5 is a perspective configuration diagram illustrating a state where a seal member composing the fuel filler port device is detached from the state of FIG. 4.
Figure 6:
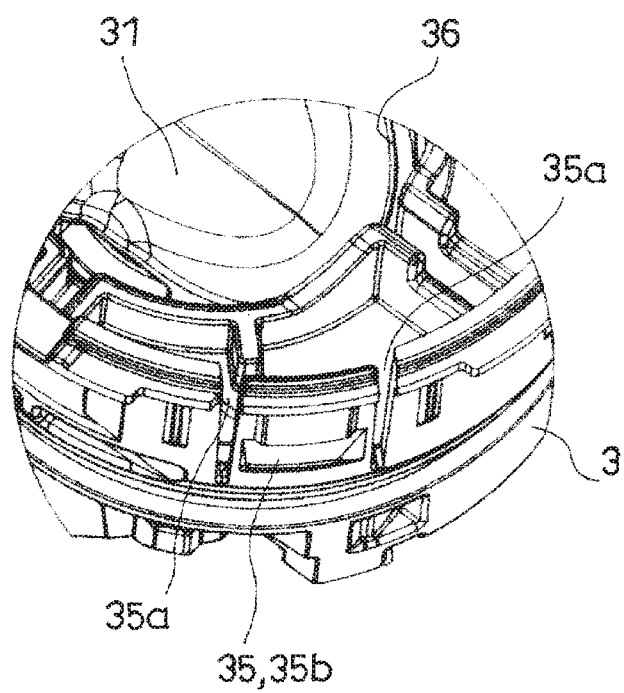
FIG. 6 is a partial perspective configuration diagram of the seal member composing the fuel filler port device.
Figure 7:
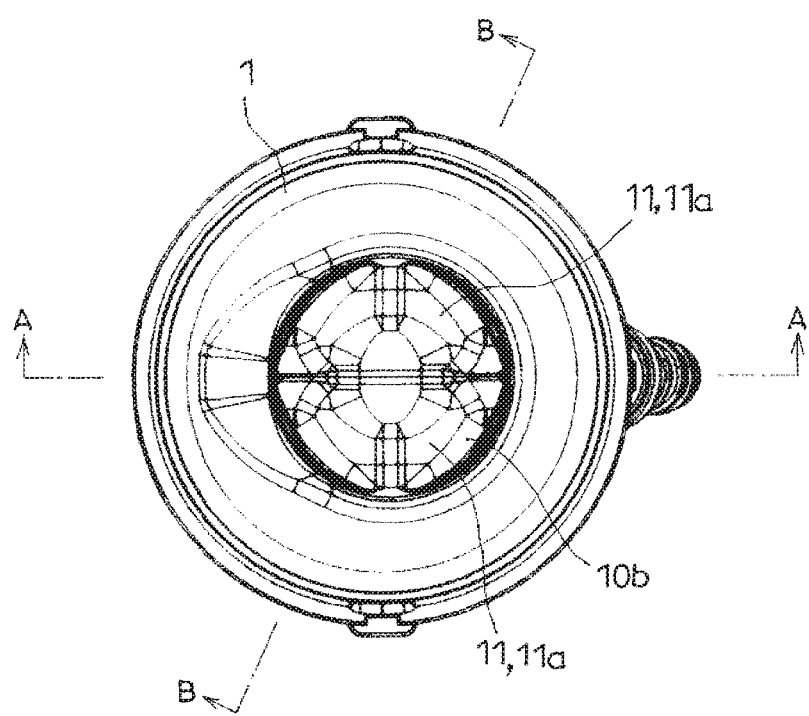
FIG. 7 is a plan configuration diagram of the fuel filler port device.

As illustrated in FIG. 5, a plurality of first engagement portions 35 . . . 35 is formed so as to be spaced from the adjacent first engagement portion 35, in the circumferential direction R of the filler pipe, in the cylindrical main body 30. In the illustrated example, each first engagement portion 35 is configured so that the protruding portion 35b is formed in an outer surface of a part of the cylindrical main body 30 partitioned by a pair of split grooves 35a, 35a extending from the upper end of the cylindrical main body 30 to near the partition wall 32. The first engagement portion 35 has a configuration capable of elastically deforming inward of the cylindrical main body.

In the illustrated example, as illustrated in FIG. 5, a notch portion 48 accommodating the projection portion 34 (see FIG. 8) hemming a lower edge of the notch portion 33 of the seal member 3, is formed in the holder member 4. When the seal member 3 is inserted to the holder member 4 from the upper end 40 of the holder member 4 in a direction of accommodating the projection portion 34 in the notch portion 48, the first engagement portion 35 causes the protruding portion 35b to contact with an inner surface of the holder member 4, bends inward, and allows the insertion. The first engagement portion 35 elastically recovers in a position in which the projection portion 34 abuts against a lower end of the notch portion 48. The protruding portion 35b of the first engagement portion 35 enters corresponding engagement hole 47 of the holder member 4, and engages with the engagement hole 47. By this engagement, the fitting state of the seal member 3 to the filler pipe side 6 is maintained.

Figure 11:
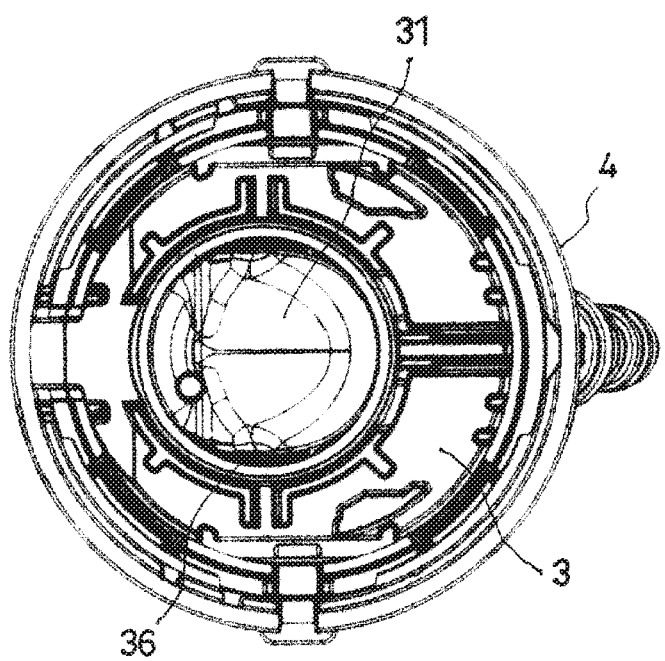
FIG. 11 is a plan configuration diagram of the filler pipe side in the state of FIG. 4.

As illustrated in FIG. 11, a circle passage port 36 that allows passage of the fuel filler nozzle is formed in the partition wall 32. The deeper side closing member 31 pressure-contacts with the partition wall 32 from downward by an urging force by an urging means (not illustrated) in the closed position, to close the passage port 36. Thereby, the closed state of the fuel filler port 5 is maintained unless the fuel filler nozzle is inserted.

(Guide Member 2)

As illustrated in FIG. 8, the guide member 2 fits between the upper end of the seal member 3 and the partition wall 32, from the upper end side of the seal member 3. A through hole 20 located above the passage port 36 of the seal member 3 in the fitting state is formed in the guide member 2. A form guiding a tip end of the fuel filler nozzle to the through hole 20 at the time of insertion of the fuel filler nozzle, is applied to an upper surface 21 of the guide member 2.

On an outer circumferential portion of the guide member 2, an engaged portion 22 with respect to a second engagement portion 37 of the seal member 3 is formed in each position facing each other with respect to the through hole 20 therebetween. A guide protruding portion 23 accommodated in the notch portion 33 of the seal member 3 is formed (see FIG. 4) in a position that is the outer circumferential portion of the guide member 2 and is located in between two engaged portions 22, 22.

As illustrated in FIG. 5, the second engagement portion 37 is formed in between the adjacent first engagement portions 35 in the cylindrical main body 30. In the illustrated example, the second engagement portion 37 is composed of an elastic engagement piece 37a having a free end projecting inward of the cylindrical main body 30 with the upper end side of the cylindrical main body 30 as a base portion. The second engagement portion 37 has a configuration capable of elastically deforming outward of the cylindrical main body 30. The reference numeral 37b in the drawing refers to a holed groove formed in the cylindrical main body in order to form the second engagement portion 37.

As illustrated in FIG. 4, the engaged portion 22 is composed of an engagement step 22b formed near the lower end of the guide member 2 by a wide groove shaped recess 22a extending from the upper end of the guide member 2 to near the lower end.

In the illustrated example, when the guide member 2 is inserted to the seal member 3 from the upper end of the seal member 3 in a direction in which the guide protruding portion 23 of the guide member 2 is accommodated in the notch portion 33 of the seal member 3, the elastic engagement piece 37a that is the second engagement portion 37, abuts against the outer surface below the engagement step 22b of the guide member 2, and bends outward, to allow the insertion. The elastic engagement piece 37a that is the second engagement portion 37 elastically recovers in a position in which the guide protruding portion 23 abuts against the lower end of the notch portion 33, and the free end of the elastic engagement piece 37a is caught by the engagement step 22b, in the upper side of the engagement step 22b. By this catching, the fitting state of the guide member 2 to the seal member 3 is maintained.

(Cover Member 1)

As illustrated in FIG. 2, the cover member 1 includes a cylindrical main body 10, and the closing member 11. The cylindrical main body 10 includes an inner flange 10a opened in a lower end, and has a loop shape in an upper end. The cylindrical main body 10 has a form in which an upper end opening 10b, which is an introduction opening of the fuel filler nozzle, is narrowed by the inner flange 10a. That is, the cylindrical main body 10 has a substantially cylindrical shape. An inner diameter of the cylindrical main body 10 is substantially equal to an outer diameter of the holder member 4.

A notch portion 12 that is opened in a lower end, and extends to a slightly lower position than the middle position in the vertical direction of the cylindrical main body 10, is formed in the cylindrical main body 10 of the cover member 1. Three window holes 13 . . . 13 are formed to be spaced from the adjacent window hole 13 in the circumferential direction R of the filler pipe, in the lower end side of the cylindrical main body 10.

In the illustrated example, as illustrated in FIG. 2, a projection portion 48a hemming the notch portion 48 is formed in the lower end side of the notch portion 48 of the holder member 4. In the illustrated example, when the upper end 40 side of the holder member 4 is accommodated in the cover member 1 from the lower end side of the cover member 1, in a direction in which the projection portion 48a of the holder member 4 is accommodated in the notch portion 12 of the cover member 1, a part 14 of the cover member 1 located in between the lower end of the cover member 1 and the window hole 13, contacts with the engagement portion 46 of the holder member 4, and bends to the outside, to allow the accommodation. When the accommodation is performed to a position in which the projection portion 48a of the holder member 4 abuts against the upper end of the notch portion 12 of the cover member 1, the engagement portion 46 enters the window hole 13, and the part 14 of the cover member 1 elastically recovers. Thereby, the attachment state of the cover member 1 to the filler pipe side 6 is maintained.

As illustrated in FIG. 8 and FIG. 9, the closing member 11 pressure-contacts with the inner flange 10a from downward in the closed position, to close the upper end opening 10b. Thereby, the closed state of the fuel filler port 5 is maintained unless the fuel filler nozzle is inserted. In the illustrated example, the closing member 11 includes a pair of flap bodies 11a, 11a, and an energizing means, not illustrated, that positions the flap bodies 11a in the closed position by energizing.

When a damage or wear occurs in the cover member 1 due to insertion, detachment, or the like of the fuel filler nozzle, apart of a tool, or the like, such as a tip end of a driver, is inserted to the insertion portion 46a through the window hole 13 of the cover member 1, and a part 14 of the cover member 1 located in between the window hole 13 and a lower end of the cover member 1, is deformed or destroyed by the part of the tool, or the like, and thereby, the cover member 1 can be easily detached from the filler pipe. In the illustrated example, a part of a tool, or the like, is inserted from upward to the insertion portion 46a located in between the adjacent engagement projection portions 46b serving as the engagement portion 46 located in one window hole 13, and the part 14 of the cover member 1 is deformed toward the outside, and thereby, the engagement of the cover member 1 with the holder member 4 is released. In the illustrated example, the recess 46f is formed in the outer surface portion of the holder member 4 in the insertion portion 46a to sufficiently facilitate the insertion of a part of a tool, or the like, to the insertion portion 46a. When the insertion portion 46a is provided in the adjacent engagement projection portions 46b, 46b serving as the engagement portion 46 located in one window hole 13, while the engagement strength of the engagement portion 46 to the window hole 13 is secured, the engagement can be easily released.

When a damage or wear occurs in the guide member 2 due to insertion, detachment, or the like of the fuel filler nozzle, after the cover member 1 is detached, a part of a tool, or the like is inserted to the wide groove shaped recess 22a of the guide member 2 from upward, and the elastic engagement piece 37a serving as the second engagement portion 37 is bent to the outside to release the engagement of the elastic engagement piece 37a and the engagement step 22b, and thereby, the guide member 2 can be easily detached from the seal member 3.

In the embodiment, inward bending of the first engagement portion 35 of the seal member 3 is allowed by detaching the guide member 2 as described above. Thus, when a damage or wear occurs in the seal member 3 due to the insertion, detachment, or the like of the fuel filler nozzle, after the guide member 2 is detached, the upper end of the first engagement portion 35 is pressed inward to release the engagement of the first engagement portion 35 and the engagement hole 47 of the holder member 4, and thereby, the seal member 3 can be easily detached from the holder member 4.

Naturally, the present invention is not limited to the embodiment described above, and includes all embodiments with which the object of the present invention can be achieved.

REFERENCE SIGNS LIST

1 Cover member
13 Window hole
46 Engagement portion
46a Insertion portion
6 Filler pipe side
R Circumferential direction of filler pipe All contents of the specification, claims, drawings, and abstract of Japanese Patent Application No. 2015-177267 filed on Sep. 9, 2015 are referred herein, and incorporated as a disclosure of the specification of the present invention.

What is claimed is:

1. A fuel filler port device, which is attached to a filler pipe, and opened and closed by a fuel filler nozzle, comprising:
   a cover member having an introduction opening for the fuel filler nozzle, a window hole, and a closing member that opens the introduction opening by insertion of the fuel filler nozzle,
   a holder member including
      an engagement portion formed at a filler pipe side, and including two engagement projection portions spaced from each other in a circumferential direction of the filler pipe and accommodated together in the window hole to be engaged with the cover member at the filler pipe side, the engagement projection portions protruding from an outer surface portion of the holder member,
      an insertion portion arranged between the engagement projection portions, and recessed inwardly from the outer surface portion of the holder member, and
      an engagement hole in the outer surface portion of the holder member,
   a guide member for the fuel filler nozzle at a deeper side of the closing member, and
   a seal member including a deeper side closing member opened and closed by the fuel filler nozzle, at a deeper side of the guide member,
   wherein the guide member includes an engaged portion having a recess portion recessed inwardly from an outer surface portion of the guide member and an engagement step protruding outwardly from a lower end of the recess portion,
   the seal member includes a protruding portion protruding outwardly from an outer surface portion of the seal member and engaged in the engagement hole, and an elastic engagement piece protruding inwardly from an inner surface portion of the seal member and engaged with the engagement step,
   engagement of the cover member and the engagement portion is adapted to be releasable by deformation or destruction of a part of the cover member between the window hole and a lower end of the cover member by insertion of a part of a tool to the insertion portion,
   the guide member is detached after releasing engagement of the cover member and the engagement portion and detaching the cover member from the engagement portion, and
   the seal member is detached after detaching the guide member.

2. The fuel filler port device according to claim 1, wherein the holder member includes a first notch portion opened downwardly from an upper end of the holder member, and a first projection portion projecting outwardly around the first notch portion,
   the seal member includes a second notch portion opened downwardly from an upper end of the seal member, and a second projection portion projecting outwardly around the second notch portion and engaged on the first projection portion,
   the guide member includes a guide protruding portion protruding outwardly from the outer surface portion of the guide member and engaged in the second notch portion, and
   the cover member includes a third notch portion opened upwardly from a lower end of the cover member and engaged with the first projection portion thereinside.

* * * * *